M. T. SCOTT.
SUBSOIL PLOW.
APPLICATION FILED MAR. 30, 1914.
1,136,172.
Patented Apr. 20, 1915.
2 SHEETS—SHEET 1.
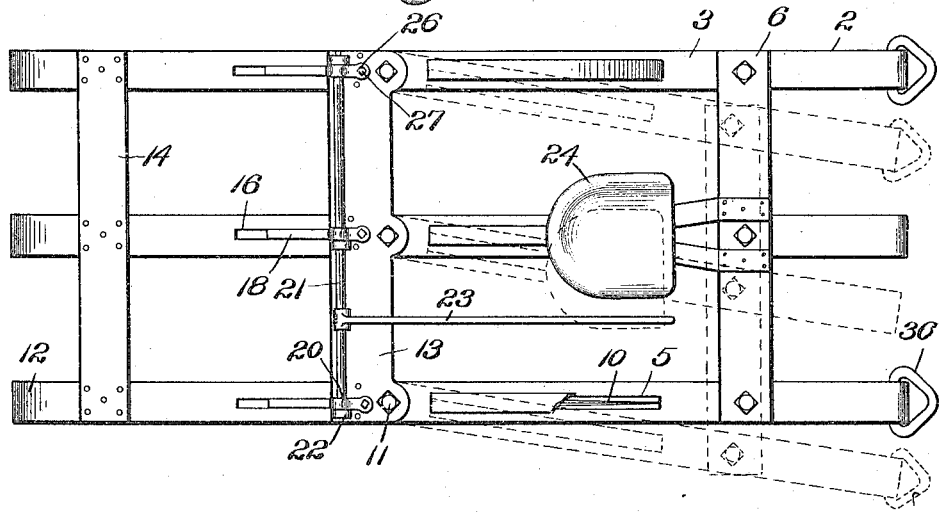
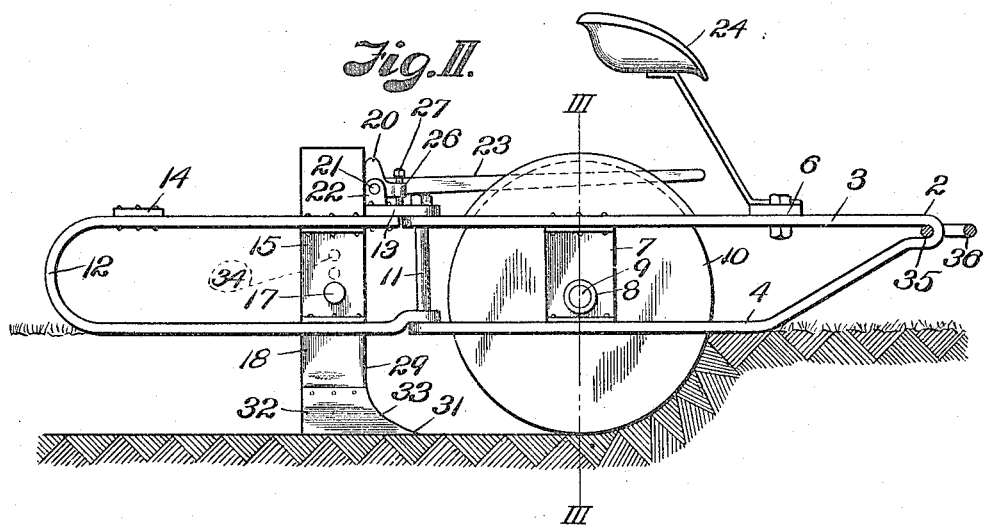
WITNESSES:
Arthur W. Caps.
Lynn A. Robinson.
INVENTOR
M. T. Scott.
BY
Arthur C. Brown,
ATTORNEY M. T. SCOTT.
SUBSOIL PLOW.
APPLICATION FILED MAR. 30, 1914.
1,136,172.
Patented Apr. 20, 1915.
2 SHEETS—SHEET 2.
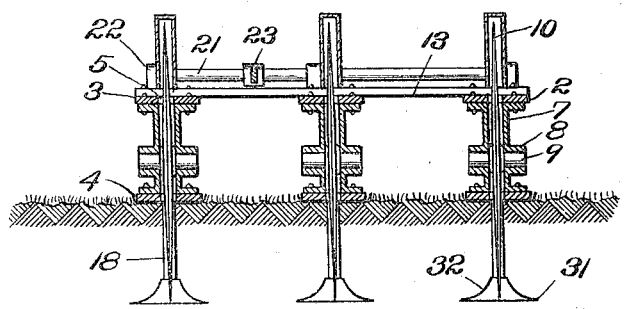
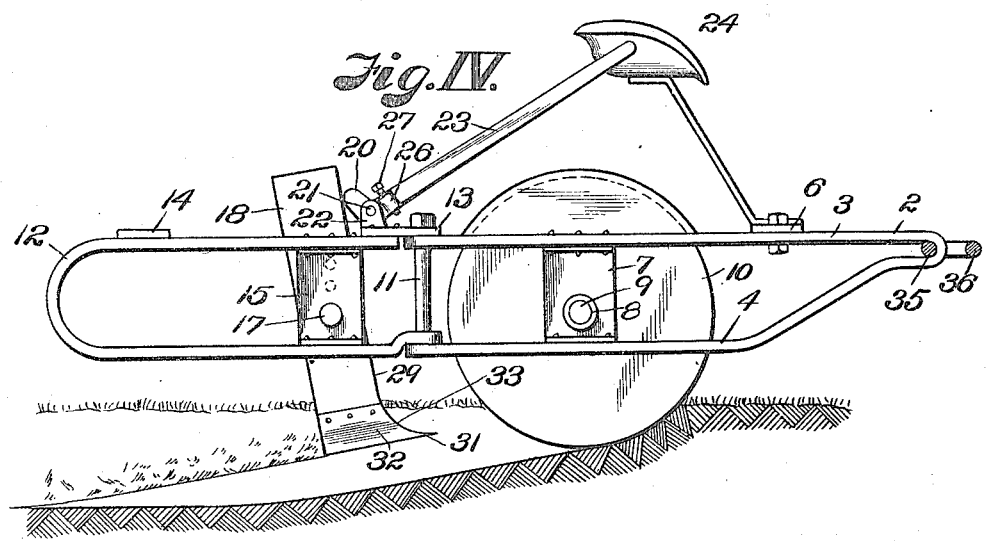
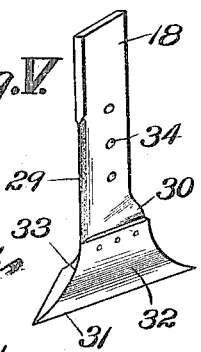
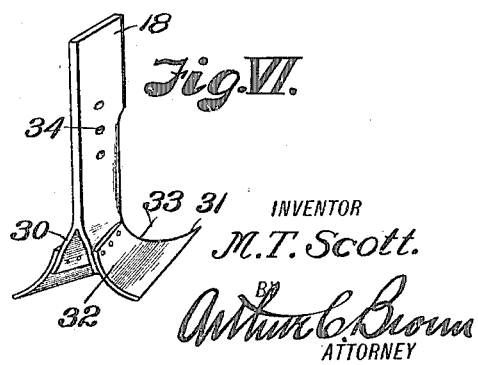
WITNESSES:
Arthur W. Caps
Lynn A. Robinson
INVENTOR
M. T. Scott.
By Arthur C. Brown
ATTORNEY

UNITED STATES PATENT OFFICE.

MATTHEW T. SCOTT, OF BLUE SPRINGS, MISSOURI.

SUBSOIL-PLOW.

1,136,172.  Specification of Letters Patent.  Patented Apr. 20, 1915.

Application filed March 30, 1914. Serial No. 828,244.

*To all whom it may concern:*

Be it known that I, MATTHEW T. SCOTT, a citizen of the United States, residing at Blue Springs, in the county of Jackson and State of Missouri, have invented certain new and useful Improvements in Subsoil-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a subsoil plow, and has for its principal object to provide a device for loosening the subsoil without materially disturbing the surface of the ground over which the plow is drawn. In accomplishing this object I have provided improved details of structure, the preferred forms of which are illustrated in the accompanying drawings, wherein:—

Figure I is a plan view of a subsoil plow constructed in accordance with my invention, and illustrating the pivotal connection of the forward and rear portions. Fig. II is a side elevation of the same, illustrating the use of the plow. Fig. III is a transverse sectional view on the line III—III, Fig. II. Fig. IV is a side elevation of the plow, illustrating the removal of the moldboard and rotary cutter from the ground. Fig. V is a front perspective view of the mold-board. Fig. VI is a rear perspective view of the same.

Referring more in detail to the parts: The plow comprises any suitable number of spaced runners 2, each consisting of spaced upper and lower portions 3—4, having slots 5 extending forwardly from near the center thereof, with the upper portions of the runners connected by cross-bars 6 to form a rigid frame. The upper and lower members 3—4 of each runner are spaced by webs 7, having bearings 8 for an axle 9 that carries rotary disks or cutters 10, one of which projects through the slots 5 in each of the runners and extends below the bottom runner member a sufficient distance to cut vegetation in advance of the plow shank, and form a guide trench in the ground through which the shank may be drawn. Pivotally connected with the rear portions of the runners 2, preferably by a king-pin 11, are U-shaped runner members 12, the front end of the bottom portion of each of which preferably overlies the rear end of the lower member 4 of the relative front member 2 and has an aperture through which the king-pin 11 projects, while the upper portion is connected with the pin by a link 13 that joins the rear runners. The upper members of all of the rear runners are united by a cross-bar 14 to unite the rear portion of the plow and form a unit of the separate runners. Fixed to the rear runners and spacing the upper and lower portions thereof are blocks 15, which are arranged in pairs on opposite sides of the slots 16 in the upper and lower portions of the rear runner members. Located within the slots 16 in each runner 12 and pivotally mounted on a shaft 17 that is carried by the blocks 15, is a shank 18, the upper end of which projects through the slot in the upper runner member and is adapted to bear against a cam 20, fixed on a shaft 21 that is revolubly mounted in bearings 22 on the rear runner members and has a lever 23 accessible from a driver's seat 24 that is mounted on the forward cross-bar 6. Integral with the cams 20 are ears 26 having set screws 27 that overlie and contact the runner members, so that the incline of the moldboard shanks may be determined by adjustment of the screws. The lower end of the shank 18 projects beneath the lower runner member and is bifurcated at its lower end; the sides of the bifurcated portion diverging rearwardly from a cutting edge 29 that extends up the front of the shank, and the upper portions of said side members having shoulders 30 that permit divergence, and also serve to exert a breaking effect on the soil through which the plow is drawn, without unduly retarding the travel of the mold-board and its shank. Attached to the diverging sides of the shank 18 is a mold-board 31 comprising side members 32 that meet at the front in a concaved cutting edge 33 and are concaved along their length to produce a twisting or breaking effect on the soil through which the mold-board is caused to travel. Each of the shanks is preferably provided with a number of apertures 34 through which the shaft 17 may be projected, so that the mold-boards may be adjusted vertically as well as pivotally, to provide for use of the plow under varying conditions.

The plow may be provided with any suitable draft appliance, but as a convenient method of hitching thereto, I provide the front end of each of the forward runner members with a socket 35 within which a draft link 36 may be located.

In use, the plow is drawn through the field with the runners bearing against the surface of the ground, and the rotary cutters breaking a way for the mold-boards and shanks by cutting a path through vegetation above the surface, and a slot through the soil below the surface. The cutting edge of the mold-board shank follows in the slot formed by the cutter; the sharp edge of the shank finding the path and the larger body following the cutting edge, and, if necessary, breaking a larger slot.

As the mold-board is carried forwardly with the shank it plows a horizontal furrow beneath the soil without turning the upper portion thereof, although the concaved shape of the mold-board tends to crack the earth horizontally, and to some extent vertically, so that the entire mass between rows is loosened, so that moisture may penetrate the soil.

By having the rear portion of the plow, that carries the mold-boards, pivotally connected with the forward members, the rotary cutter and mold-board sections may be turned independently, in order to turn the plow, and by having the mold-board shanks pivotally mounted, they may be pointed downwardly when the mold-boards are to enter the ground or upwardly when they are to be removed; the angle being determined by the elevation of the lever 33.

Having thus described my invention, what I claim as new therein, and desire to secure by Letters-Patent, is:

1. The combination with a runner, comprising spaced upper and lower portions, each having a longitudinal slot, of a shank projected through said slots and below the lower member, means for fixing the shank to said runner, and a mold-board carried by said shank below the runner.

2. The combination with spaced runners, each having a longitudinal slot, of a shank projected through each of said slots and extending below said runners, a shaft extending across the top of said runners, cams on said shaft for engaging said shanks, a set screw in each cam for engaging each runner, means for anchoring the shanks to the runners, and a mold-board fixed to each shank beneath the runners.

3. A runner comprising spaced upper and lower portions, each having a longitudinal slot, a block spacing the runner members, a shank projected through the slots, means for pivotally attaching the shank to the block, and a mold-board on said bar beneath the runner.

4. The combination with spaced runners, each comprising longitudinally slotted upper and lower portions, cross-bars fixed to and spacing the runners, journal blocks connecting and spacing the members of the respective runners, an axle mounted in said journal blocks, rotary cutters mounted on said axle and adapted for travel in the runner slots, back of the rotary cutters, means for bracing and anchoring the shanks, and mold-boards on said shanks beneath the runners.

5. The combination with a runner comprising spaced upper and lower members, blocks for spacing said members, a shank having a plurality of apertures therein and extending between the blocks, and a pin projecting through the blocks and through one of the shank apertures to pivotally mount the shank on said blocks.

6. The combination with pivotally connected forward and rear runner members, of a mold-board shank mounted in the rear runner member, and a mold-board carried by said shank.

7. The combination with pivotally connected forward and rear runner members, of a mold-board shank mounted in the rear runner member, a mold-board carried by said shank, and means for adjusting the angle of inclination of the mold-board shank.

8. The combination with a runner member, of a mold-board shank pivotally mounted on said runner member, a shaft pivotally mounted adjacent the shank, a cam fixed on said shaft and engaging the shank, and a lever fixed to the shaft, for the purpose set forth.

9. The combination with a runner member, of a mold-board shank pivotally mounted on said runner member, a shaft pivotally mounted adjacent the shank, a cam fixed on said shaft and engaging the shank, a lever fixed to the shaft, an ear on said shaft, and a set screw in said ear for engaging the runner, for the purpose set forth.

10. The combination with a plurality of rigidly connected runner members, of a plurality of runner members pivotally connected to said rigid runners, a plurality of mold board shanks mounted in said rigid runners, and mold-boards on said shanks beneath said runners.

11. The combination with a plurality of rigidly connected runner members, runner members pivotally connected with said rigid runners, a seat on said runners, mold-board shanks pivotally mounted in said rigid runners, mold-boards on said shanks, a shaft pivotally mounted on said rigid runners adjacent said shanks, cams on said shaft adapted for engaging said shanks, and a hand lever on said shaft extending to a point adjacent said seat.

In testimony whereof I affix my signature in presence of two witnesses.

MATTHEW T. SCOTT.

Witnesses:
LYNN A. ROBINSON,
L. E. COATS.